(12) United States Patent
Geißenhöner et al.

(10) Patent No.: US 10,988,183 B2
(45) Date of Patent: Apr. 27, 2021

(54) LOCKING DEVICE FOR A BUTTRESS OF A FLYING BUTTRESS HOOD

(71) Applicant: Dr. Ing. h.c. F. Porsche Aktiengesellschaft, Stuttgart (DE)

(72) Inventors: Kai Geißenhöner, Vaihingen (DE); Detlev Ranft, Ettlingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 234 days.

(21) Appl. No.: 16/402,600

(22) Filed: May 3, 2019

(65) Prior Publication Data

US 2019/0359263 A1 Nov. 28, 2019

(30) Foreign Application Priority Data

May 22, 2018 (DE) ...................... 10 2018 112 251.9

(51) Int. Cl.
*B62D 25/12* (2006.01)
*B62D 25/10* (2006.01)
*B62D 23/00* (2006.01)

(52) U.S. Cl.
CPC .......... *B62D 25/12* (2013.01); *B62D 25/105* (2013.01); *B62D 23/00* (2013.01); *E05Y 2900/536* (2013.01)

(58) Field of Classification Search
CPC ...... B62D 25/12; B62D 25/105; B62D 23/00; E05Y 2900/536; B60J 7/12; B60J 7/0053; B60J 7/1252; B60J 7/185
See application file for complete search history.

(56) References Cited

U.S. PATENT DOCUMENTS

| | | | | |
|---|---|---|---|---|
| 6,347,827 | B1 * | 2/2002 | Maass | B60J 7/1265 296/107.08 |
| 7,172,236 | B1 * | 2/2007 | Chevtsov | B60J 7/1678 296/107.17 |
| 7,740,302 | B2 | 6/2010 | Heselhaus | |
| 9,636,977 | B2 * | 5/2017 | Matsumoto | B60J 7/146 |
| 9,783,031 | B2 * | 10/2017 | Froeschle | B60J 7/20 |
| 2004/0066057 | A1 * | 4/2004 | Quindt | B60J 1/1838 296/107.08 |
| 2005/0231002 | A1 * | 10/2005 | Klatt | B60J 5/0411 296/146.6 |

(Continued)

FOREIGN PATENT DOCUMENTS

| | | |
|---|---|---|
| DE | 102006007362 A1 | 8/2007 |
| DE | 102009057631 A1 | 6/2011 |

(Continued)

*Primary Examiner* — D Glenn Dayoan
*Assistant Examiner* — E Turner Hicks
(74) *Attorney, Agent, or Firm* — RatnerPrestia

(57) ABSTRACT

A locking device for a buttress of a flying buttress hood of a vehicle, having a locking element for locking the buttress in a locking position and a display device for visually signaling the locking position. The display device has a display element which is coupled via a coupling element to the locking element and therefore a movement of the locking element into the locking position moves the display element via the coupling element into a first display position and, upon leaving the locking position, the locking element via the coupling element moves the display element from the first display position into at least one second display position.

10 Claims, 2 Drawing Sheets

(56) References Cited

U.S. PATENT DOCUMENTS

| | | | |
|---|---|---|---|
| 2008/0106117 A1* | 5/2008 | Garska | B60J 7/1247 296/118 |
| 2008/0296925 A1* | 12/2008 | Fallis, III | B60J 1/183 296/108 |
| 2010/0164247 A1* | 7/2010 | Neubrand | B60J 7/20 296/116 |

FOREIGN PATENT DOCUMENTS

| | | |
|---|---|---|
| JP | H08156606 A | 6/1996 |
| JP | 3756546 B2 | 3/2006 |
| JP | 2006232083 A | 9/2006 |

* cited by examiner

LOCKING DEVICE FOR A BUTTRESS OF A FLYING BUTTRESS HOOD

CROSS-REFERENCE TO RELATED APPLICATION

This application claims priority to German Patent Application No. DE 10 2018 112 251.9, filed May 22, 2018, which is incorporated by reference herein in its entirety.

FIELD OF THE INVENTION

The present invention relates to a locking device for a buttress of a flying buttress hood, and to a flying buttress hood comprising at least one buttress with such a locking device.

BACKGROUND OF THE INVENTION is It is known that vehicles are provided with automatic or manually adjustable hoods when they are "convertible vehicles". Among the latter, in addition to simple hoods, there are what are referred to as a flying buttress hoods which have one or more buttresses which extend in particular along the vehicle axis. When closing such a flying buttress hood, not only does the hood have to be closed and latched to the windshield of the vehicle, but also the one or more buttresses have to be brought into a lockable position and locked there.

A flying buttress can be formed when the C-pillars on a car stretch beyond the rear glass, adding stability at high speeds.

It is disadvantageous in the case of the known solutions that said additional locking of the buttress can be identified only with a high outlay. For example, it has to be identified by the overall geometry of the buttress whether, by correlation with the rest of the body of the vehicle, the buttress is in a locked and therefore finally closed state. Alternatively, use can also be made of complicated sensors in order to be able to establish the final reaching of the locking position and therefore completed locking. In both cases, a relatively high outlay or high costs is or are necessary in order to be able to ensure locking.

SUMMARY OF THE INVENTION

Described herein is an improvement to the identifiability of locking of a buttress of a flying buttress hood in a cost-effective and simple manner.

Features and details which are described in conjunction with the locking device according to aspects of the invention also apply, of course, in conjunction with the flying buttress hood according to aspects of the invention and vice-versa in each case, and therefore reference is or can be made constantly from one to the other in respect of the disclosure is of the individual aspects of the invention.

According to aspects of the invention, a locking device serves for locking a buttress of a flying buttress hood of a vehicle. Such a locking device has a locking element for locking the buttress in a locking position and a display device for visually signaling said locking position. The display device is provided with a display element which is coupled via a coupling element to the locking element. In this manner, during a movement of the locking element into the locking position, the display element is moved via the coupling element into a first display position. Upon leaving the locking position, the locking element via the coupling element moves the display element from the first display position into at least one second display position.

According to aspects of the invention, the locking device is therefore provided with an additional function. This involves visual signaling or a visual display. Locking functionalities can be predetermined in a known manner by the locking device, for example by mechanical locking means. For example, the locking element can have a hook which engages in a corresponding mating hook on the body of the vehicle. As soon as the flying buttress hood has therefore moved into a closed position over the convertible vehicle, the buttresses can latch in place and can be locked in said covered position. Said hook element as locking element is introduced into the mating hook element and can thereby ensure mechanical securing by forming a force fit with the body of the vehicle. In order to ensure that the flying buttress hood remains in a stable manner in said closed position even at high speeds of the vehicle, said locking is designed in particular for transmitting force or introducing force into the body of the vehicle in a mechanical manner.

Since said locking functionality is of substantial importance for the stability of the hood in the driving mode, the display device serves to display the actual locking situation. The locking function is then, as it were, mechanically active when the locking element is in a corresponding locking position. If the locking element is designed, for example, as a hook element, the locking position is the same position as that in which the hook element has been hooked into a mating hook element and the force-transmitting connection with the body has thereby been formed. In said locking position, corresponding visual information is now intended to be emitted by the locking device and able to be imparted to the user of the locking device. For this purpose, the locking device according to aspects of the invention is provided with the display device.

The display device involves a display element for said additional display functionality about the status of the locking functionality. Said display element is movable between a first display position and at least one second display position. This movement can be provided, for example, relative to a housing or to a mating display element. The first display position correlates here to the locking position. This therefore means that the display element is always in the first display position when the locking element is in the locking position. The user of the locking device can therefore be provided with information that, by means of the visual display of the display element in the first display position, it is possible to read the information that the locking device together with the locking element is in the locking position. By contrast thereto, the information can be output that, when a display element is outside the first display position, the locking device is accordingly not locked and the locking element is outside the locking position. This position outside the locking position can also be displayable by at least one specific second display position.

In particular, the display is also designed in the form of a signal, and therefore it can be perceived in a visually simple, rapid and especially unambiguous manner. For example, intuitive operability can be provided if, in the second display position, the display element includes a red output while the display element emits or presents a green signal color in the first display position. However, it is also conceivable for a red signal color to display the lack of locking only in the second display position while the display element withdraws so in the first display position and, as it were, cannot be seen passively or can be seen only slightly visually.

For the correlation of the movement of the display element with the movement of the locking element, the coupling element can directly or indirectly provide a preferably mechanically designed coupling. The coupling element can thus be, for example, a mechanical lever which is connected on the one side to the locking element and on the other side to the display element. The movement of the locking element can thereby be converted as a mechanical conversion into the corresponding relative movement of the display element. A particularly simple embodiment can be achieved if the coupling element is formed in one piece, integrally and/or monolithically with the display element. In the same manner, it is also conceivable for the coupling element to be formed in one piece, monolithically or integrally with the locking element. Of course, locking element, coupling element and display element can also be formed together as a threesome integrally, monolithically and/or in one piece.

Advantages can be afforded if, in the case of a locking device according to aspects of the invention, the display device has a viewing window, in particular in a housing of the locking device, through which the display element is at least partially visible in at least one of the display positions. Such a viewing window in the housing now permits inspection of the interior of the housing, in which in particular the display element is movably mounted. In particular, by correlation between the display element and the viewing window, the corresponding differentiability between the display positions can be ensured. This is based in particular on an overlapping or partial overlapping of the inspection possibility through the viewing window and the corresponding relative position of the display element. In addition to differentiation between visibility and non-visibility of the display element, the use of different colors, in particular signal colors, can also be used on a display element of the display device.

Advantages are further afforded if, in the case of a locking device according to aspects of the invention, the display element lies or substantially lies against an inner side of the viewing window. In at least one of the display positions, the display element therefore closes the viewing window as it were from the inner side, and therefore a visual closure can be provided with lateral walls of the viewing window. Further inspection of the interior of the housing through the viewing window is therefore prevented by the display element in particular in at least one of the display positions.

It is a further advantage if, in the case of a locking device according to aspects of the invention, the viewing window has lateral walls which cover an offset with respect to the display element. The viewing window can therefore not only be understood as a pure opening in the housing but also as a deep-drawn viewing window with lateral walls. This leads to the provision of improved viewing protection and also glare protection for reading the display element. This is the case in particular if the viewing window is a round or substantially round viewing window. The lateral walls can then also be of cylindrical or substantially cylindrical design. However, conical or cone-shaped or frustoconical designs of the lateral walls are also conceivable in principle within the context of the present invention.

It can likewise be of advantage if, in the case of a locking device according to aspects of the invention, the display element is of flat or substantially flat, in particular plane or substantially plane design. The display element in a flat configuration reduces the necessary space requirement and the necessary design. The weight can thereby also be is reduced. Not least, by means of a flat or plane configuration, the necessary movement clearance can be reduced, and therefore this also contributes to the compactness of the overall system of the locking device. The display element itself is preferably completely configured as such a flat element or plane flat element, for example of sheet metal or metal sheet.

Further advantages can be obtained if, in the case of a locking device according to aspects of the invention, the display element has at least one visually identifiable display section which produces a different visual perception in the display positions. Such a display section can be, for example, that region of the display element which is identifiable through a described viewing window in at least one of the display positions. The different visual perception can already be ensured by the different relative movement or relative positioning with respect to a housing and/or of a viewing window. However, the use of one or more differentiable signal colors is also possible in order to produce the visual perception in a different manner. Of course, two or more display sections which specifically correlate in particular to two or more different display positions can also be provided.

It is furthermore advantageous if, in the case of a locking device according to aspects of the invention, the display device, in particular the display element and/or the coupling element, has a latching means, for reversible latching in at least one of the display positions. It can therefore be ensured that not only the locking itself but also the corresponding display can be designed in a latching manner. An erroneous display in the event of a defect, a distortion or another disadvantageous mechanical influence on the display device is therefore avoided. In particular, the latching takes place in the free position, i.e. in the non-locked position, in order to be able to avoid or completely rule out an erroneous display of the locking position.

Further advantages are afforded if, in the case of a locking device according to aspects of the invention, the display element and/or the coupling element emits an acoustic signal when at least one of the display positions is reached. This can be combinable, for example, with a latching as per the previous paragraph. Such an acoustic signaling leads to an additional output of information becoming possible, and therefore a further improvement in the intuitive operability of the locking device is provided. This can be based on an automatic or a manual or partially manual locking. The production of the acoustic signal as an additional securing functionality is preferably designed to be reversible or to be able to be output repeatedly in order, during repeated carrying out of is the locking movement, also to be able to provide a repeated output of said acoustic signal.

The present invention likewise relates to a flying buttress hood for a vehicle, comprising at least one buttress, wherein the at least one buttress has a locking device according to aspects of the invention. A flying buttress hood according to aspects of the invention therefore involves the same advantages as have been explained in detail with respect to a locking device according to aspects of the invention.

A flying buttress hood according to aspects of the invention can be developed to the effect that at least two buttresses are provided, wherein the two buttresses, in particular all of the buttresses, have a dedicated locking device according to the present invention. All of the locking devices of all of the buttresses are preferably of identical or substantially identical configuration, and therefore the corresponding advantages can be provided together in the same manner for the entire flying buttress hood and preferably also for all of the buttress devices.

BRIEF DESCRIPTION OF THE DRAWING

Further advantages, features and details of the invention emerge from the description below in which exemplary embodiments of the invention are described in detail with reference to the drawings. The features mentioned here in the claims and in the description may be essential to the invention in each case individually by themselves or in any desired combination. Schematically in the drawings:

DETAILED DESCRIPTION OF THE INVENTION

Figure 1:
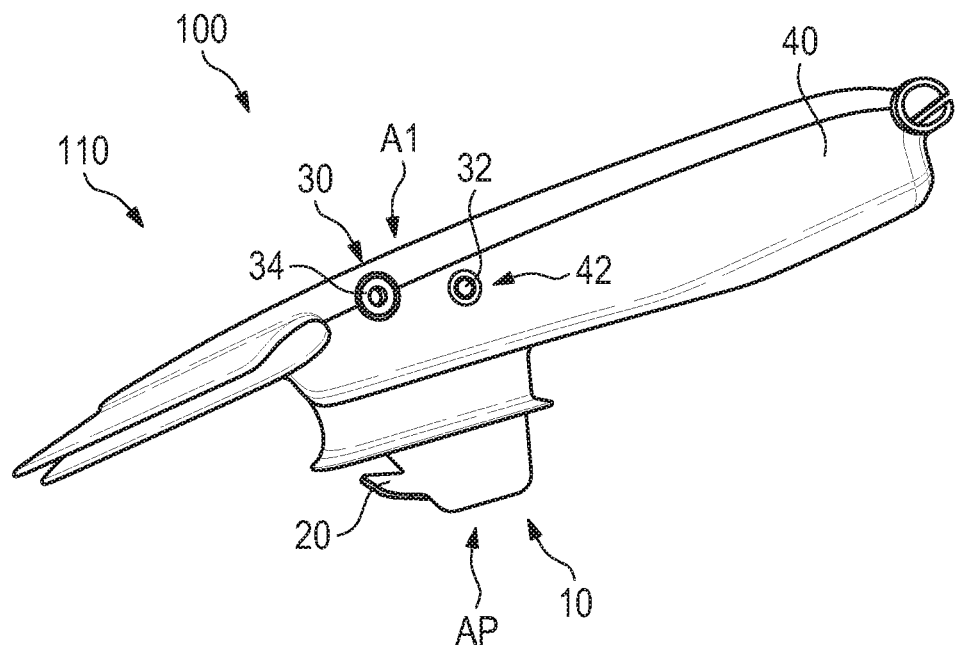
FIG. 1 shows an embodiment of a locking device according to aspects of the invention in a locking position.

FIGS. 1 to 4 schematically show a refinement of a locking device 10 according to aspects of the invention. The latter serves for locking a buttress 110 of a flying buttress hood 100. A buttress may also be referred to herein as a fin. In order to be able to provide this primary locking functionality, a locking element 20 is provided, here in a hook-shaped embodiment. Said locking element 20 can be moved into a locking position AP according to FIGS. 1 and 3 in order to be able to lock the buttress 110 in a corresponding, associated, closed hood position of the flying buttress hood 100.

In order to carry out the above locking, a mechanical movement of the locking element 20 into the described locking position AP takes place. During this movement of the locking element 20, a coupling element 34 in the interior of the housing 40 is also moved at the same time. By means of this simultaneous movement, the movement of the locking element 20 into the locking position AP is converted into a correlating compulsory movement of the display element 32. The display element 32 is configured here as a flat sheet metal section with a signal color in an associated display section 33.

Figure 2:
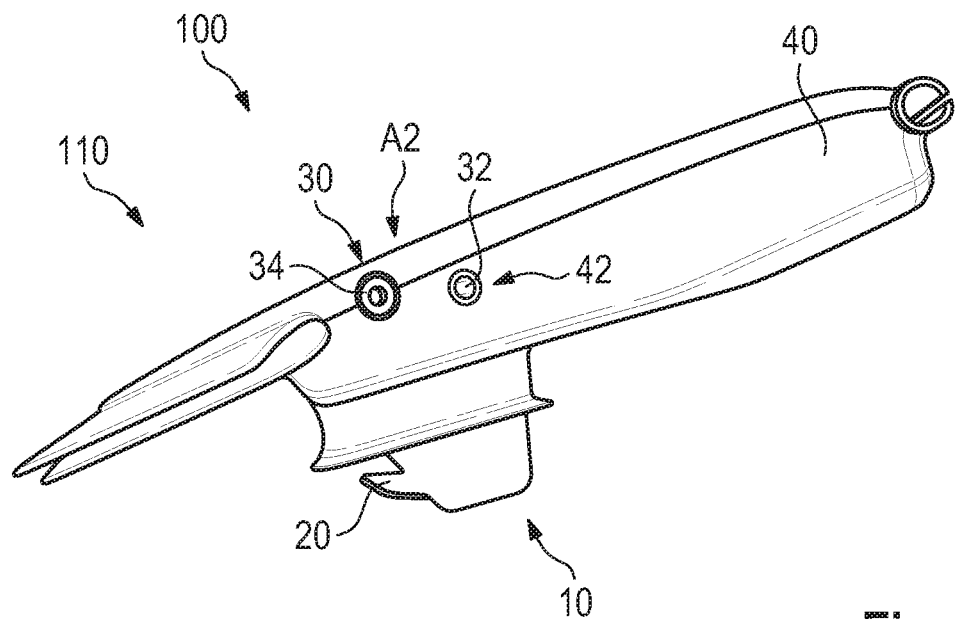
FIG. 2 shows the embodiment of FIG. 1 outside the locking position.
Figure 3:
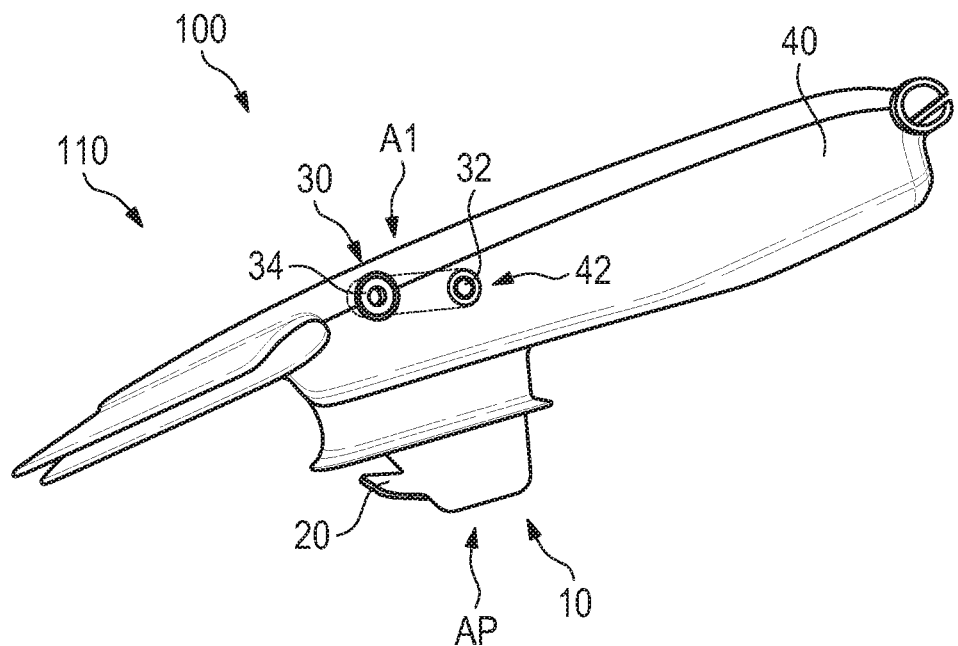
FIG. 3 shows the embodiment of FIGS. 1 and 2 in the locking position in a partially open housing.
Figure 4:
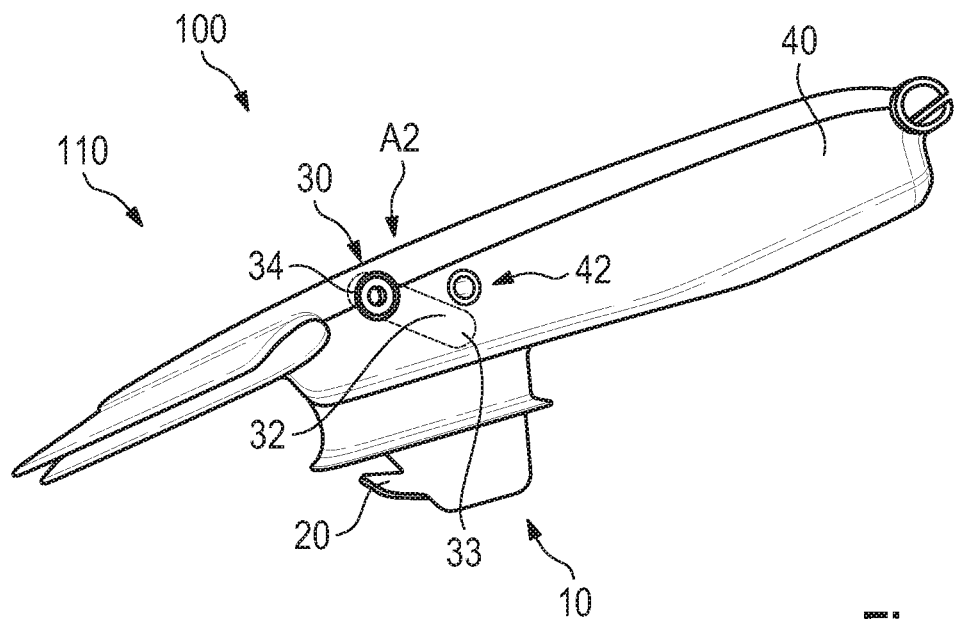
FIG. 4 shows the embodiment of FIGS. 1 to 3 outside the locking position with the housing being partly able to be inspected.

With reference to FIGS. 1 and 3 with regard to the locking position AP and with reference to FIGS. 2 and 4 outside the locking position AP, it can now be seen how a display function functions in the case of a locking device 10 according to aspects of the invention. As soon as the flying buttress hood 100 is intended to be closed, a closing movement of the buttress 110 also takes place. Before said closing movement is ended, the locking is released, i.e. the locking element 20 according to FIGS. 2 and 4 is located outside the locking position AP. It is illustrated in said positions how, with reference to FIGS. 2 and 4, the display section 33 of the display element 32 is now located outside the viewing window 42 in the housing 40, and therefore, by corresponding inspection in said second display position A2, this information of the lack of locking position AP can be seen by the user.

If the locking element 20 is subsequently now moved into a locking position AP, the corresponding display element 32 is moved via the coupling element 34 into the first display position A1. This situation is illustrated in FIGS. 1 and 3. By the changed overlap and correlation between the viewing window 42 and the display section 33, a different signaling is now emitted, and therefore it can be seen visually that the display element 32 is located in the first display position A1 and, by the systematic mechanical coupling, the is locking element 20 is therefore in the locking position AP.

The above explanation of the embodiment describes the present invention exclusively within the scope of examples. Of course, individual features of the embodiments, if technically expedient, can be freely combined with one another without departing from the scope of the present invention.

What is claimed is:

1. A locking device for a buttress of a flying buttress hood of a vehicle, said locking device comprising:
   a locking element for locking the buttress in a locking position; and
   a display device for visually signaling the locking position, wherein the display device has a display element which is coupled via a coupling element to the locking element, and therefore a movement of the locking element into the locking position moves the display element via the coupling element into a first display position and, upon leaving the locking position, the locking element via the coupling element moves the display element from the first display position into at least one second display position.

2. The locking device as claimed in claim 1, wherein the display device has a viewing window in a housing of the locking device through which the display element is at least partially visible in at least one of the display positions.

3. The locking device as claimed in claim 2, wherein the display element either lies or substantially lies against an inner side of the viewing window.

4. The locking device as claimed in claim 2, wherein the viewing window has lateral walls which cover an offset with respect to the display element.

5. The locking device as claimed in claim 1, wherein the display element is either flat or substantially flat.

6. The locking device as claimed in claim 1, wherein the display element has at least one visually identifiable display section which produces a different visual perception in the display positions.

7. The locking device as claimed in claim 1, wherein at least one of the display element and the coupling element has a latch for reversible latching in at least one of the display positions.

8. The locking device as claimed in claim 1, wherein at least one of the display element and the coupling element emits an acoustic signal when at least one of the display positions is reached.

9. A flying buttress hood for a vehicle, comprising the at least one buttress, wherein the at least one buttress has the locking device as claimed in claim 1.

10. The flying buttress hood as claimed in claim 9, comprising at least two buttresses, wherein the two buttresses each include one of the locking devices.

* * * * *